(12) United States Patent
Chung et al.

(10) Patent No.: US 7,943,113 B2
(45) Date of Patent: May 17, 2011

(54) LITHIUM-MANGANESE OXIDES, METHOD FOR PREPARING THE SAME, AND LITHIUM ADSORBENT USING THE SAME

(75) Inventors: Kang-Sup Chung, Daejeon (KR); Jae-Chun Lee, Daejeon (KR); Jin-Ki Jeong, Daejeon (KR); Yang-Soo Kim, Jeollanam-do (KR); Hee-Jin Kim, Jeollanam-do (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 159 days.

(21) Appl. No.: 11/956,093

(22) Filed: Dec. 13, 2007

(65) Prior Publication Data
US 2009/0142255 A1    Jun. 4, 2009

(30) Foreign Application Priority Data
Nov. 29, 2007   (KR) .................. 10-2007-0122940

(51) Int. Cl.
  *C01G 45/12*   (2006.01)
(52) U.S. Cl. ............... 423/599; 423/594.4; 423/594.6; 423/596; 423/594.15
(58) Field of Classification Search ............... 423/594.2, 423/594.4, 594.6, 596, 598, 599; 429/224, 429/324
See application file for complete search history.

(56) References Cited

U.S. PATENT DOCUMENTS

| 2003/0082452 A1* | 5/2003 | Ueda et al. ................ 429/224 |
| 2004/0234855 A1* | 11/2004 | Li ........................ 429/231.1 |
| 2006/0099508 A1* | 5/2006 | Thackeray et al. ....... 429/231.1 |

FOREIGN PATENT DOCUMENTS

| EP | 1837937 | 9/2007 |
| JP | 2005-089279 | 4/2005 |
| KR | 10-2006-0112823 | 11/2006 |

OTHER PUBLICATIONS

Office Action dated Apr. 28, 2009, for Korean application No. 10-2007-0122940.
Notice of Allowance dated Nov. 23, 2009, for Korean application No. 10-2007-0122940, citing the above references.

* cited by examiner

*Primary Examiner* — Stuart Hendrickson
*Assistant Examiner* — Richard M Rump
(74) *Attorney, Agent, or Firm* — Lowe Hauptman Ham & Berner LLP

(57) ABSTRACT

There is provided Lithium-manganese oxides expressed as the following chemical formula 1, $$Li_{1+x}Mn_{1-x-y}M_yO_{2+z},\quad \text{[Chemical Formula 1]}$$

wherein $0.01 \leq x \leq 0.5$, $0 \leq y \leq 0.3$, $-0.2 \leq z \leq 0.2$, and M is a metal selected from the group consisting of Ti, Mn, V, Cr, Fe, Co, Ni, Cu, Zn, Zr, Nb, Mo, W, Ag, Sn, Ge, Si, Al, and alloy thereof.

8 Claims, 3 Drawing Sheets

LITHIUM-MANGANESE OXIDES, METHOD FOR PREPARING THE SAME, AND LITHIUM ADSORBENT USING THE SAME

CROSS-REFERENCE TO RELATED APPLICATIONS

The present invention claims priority of Korean Patent Application No. 10-2007-0122940, filed on Nov. 29, 2007, which is incorporated herein by reference.

BACKGROUND OF THE INVENTION

1. Field of the Invention

The present invention relates to lithium-manganese oxides or lithium-manganese metal oxides, a method of preparing the same, and lithium adsorbent using the same; and more particularly, to lithium-manganese oxides or lithium-manganese metal oxides, and a method of preparing the same that can be used as a precursor of lithium adsorbent or material of a secondary battery.

The present invention was deduced from researches performed as one of marine research and development projects of Ministry of Maritime Affairs and Fisheries [Task Management No. GFB20010004, Project Title: The Development of Technology for Recovering the Valuable Minerals from Seawater and Sand].

2. Description of Related Art

Technologies for recovering useful metals or minerals from seawater may be classified into technologies for collecting useful metals from seawater, and technologies for economical collecting systems. Researches on technologies for recovering various useful metals including lithium existing in seawater have been performed for about 30 years. As a result, while researches for recovering a small amount of useful metals have been performed, the technologies cannot be commercialized. Useful metal recovering technologies researched and developed up to now are known to include an adsorption method, a coprecipitation method, a solvent extraction method, an ion flotation method, an ion exchange method, a bioconcentration method, and so on. Among the above methods, the adsorption method has highest probability of commercial utilization.

Adsorbent used for the adsorption method may be classified into inorganic adsorbent and organic adsorbent. The adsorbent is required to provide high adsorption performance and selectivity, rapid adsorption speed, high physical strength, and good chemical stability and durability.

In particular, in selective adsorption of lithium, lithium-manganese oxides and lithium-transition metal oxides including transition metal having structure capable of intercalation and deintercalation of lithium ions are used as a precursor of lithium adsorbent. In addition, since lithium-manganese oxides or lithium-metal oxides have spinel and layered network structure to smoothly perform intercalation and deintercalation of lithium ions, the oxides can be used as active materials of electrodes for a lithium secondary battery.

The lithium-manganese oxides or lithium-transition metal oxides having the layered structure, for example, $LiMnO_2$, $LiCoO_2$, $LiNiO_2$, and so on, have R-3m structure that lithium, oxygen and transition metal element alternately form the layered structure. Viewing $LiMnO_2$ as an example of the lithium-transition metal oxides with reference to FIG. 1, manganese ions exist between oxygen ions having hexagonal closed packing, i.e., octahedral site of oxygen ions, and lithium ions exist octahedral site thereunder (see FIG. 1A). When lithium ions are inserted into the compound to form $Li_2MnO_2$ structure, a manganese ion layer exists, an oxygen ion layer exists under the manganese ion layer, a lithium layer is disposed to form a multi-layer, another oxygen layer exist under the lithium layer, and another manganese ion layer exist thereunder (see FIG. 1B). Such reversible intercalation and deintercalation of lithium ions enables lithium-transition metal oxides having the layered structure to be used as a precursor of adsorbent of lithium ions and electrode materials of a lithium secondary battery.

However, in conventional lithium-manganese oxides or lithium manganese oxides including transition metals, intercalation and deintercalation of lithium ions are more effectively and smoothly performed to improve lithium adsorption performance and selectivity. In addition, there is still need for materials that can be used as a precursor of lithium adsorbent and active materials of electrodes of a lithium secondary battery having better physical strength and chemical stability.

SUMMARY OF THE INVENTION

An aspect of the present invention is accomplished by providing lithium-manganese oxides and a method for preparing the same capable of effectively and readily performing intercalation and deintercalation of lithium ions.

Another aspect of the present invention is accomplished by providing selective adsorbent of lithium ions using the lithium-manganese oxides as a precursor.

An embodiment of the present invention is directed to provide Lithium-manganese oxides expressed as the following chemical formula 1, $$Li_{1+x}Mn_{1-x-y}M_yO_{2+z},\qquad\text{[Chemical Formula 1]}$$

wherein $0.01 \leq x \leq 0.5$, $0 \leq y \leq 0.3$, $-0.2 \leq z \leq 0.2$, and M is a metal selected from the group consisting of Ti, Mn, V, Cr, Fe, Co, Ni, Cu, Zn, Zr, Nb, Mo, W, Ag, Sn, Ge, Si, Al, and alloy thereof.

Another embodiment of the present invention is directed to provide a method for preparing lithium-manganese oxides including: solid mixing lithium raw material, manganese raw material and metal raw material—metal is expressed as the following chemical formula 1—to manufacture mixture; and heat treating the mixture under reduction atmosphere, $$Li_{1+x}Mn_{1-x-y}M_yO_{2+z},\qquad\text{[Chemical Formula 1]}$$

wherein $0.01 \leq x \leq 0.5$, $0 \leq y \leq 0.3$, $-0.2 \leq z \leq 0.2$, and M is a metal selected from the group consisting of Ti, Mn, V, Cr, Fe, Co, Ni, Cu, Zn, Zr, Nb, Mo, W, Ag, Sn, Ge, Si, Al, and alloy thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter. In addition, when specific description of conventional arts related to the present invention may unnecessarily make the present invention ambiguous, detailed description of the conventional arts may be omitted. Hereinafter, the present invention will be described in detail with reference to the accompanying drawings.

The present invention relates to lithium-manganese oxides expressed as the following chemical formula 1

$$Li_{1+x}Mn_{1-x-y}M_yO_{2+z}$$ [Chemical Formula 1]

wherein $0.01 \leq x \leq 0.5$, $0 \leq y \leq 0.3$, $-0.2 \leq z \leq 0.2$, and M is a metal selected from the group consisting of Ti, Mn, V, Cr, Fe, Co, Ni, Cu, Zn, Zr, Nb, Mo, W, Ag, Sn, Ge, Si, Al, and alloy thereof.

The lithium-manganese oxides in accordance with the present invention is characterized in that a portion of Mn is substituted with lithium and other metals M to readily perform intercalation and deintercalation of lithium ion in lithium-manganese oxide structure such as layered structure of $LiMnO_2$ used for conventional lithium ion adsorbent or a secondary battery electrode.

Figure 1A:
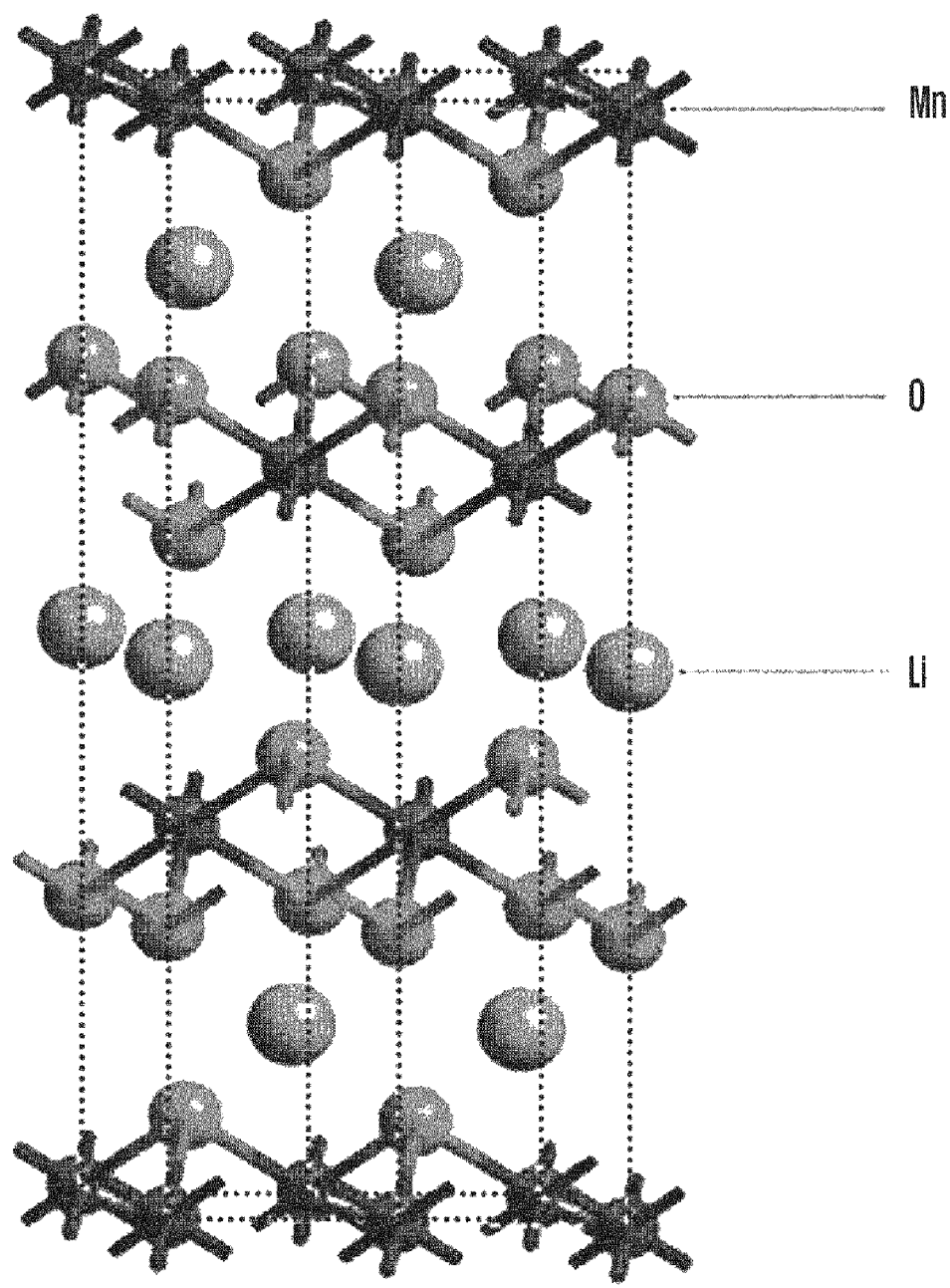
FIG. 1A is a schematic view showing deintercalation of lithium-manganese oxides having layered structure.
Figure 1B:
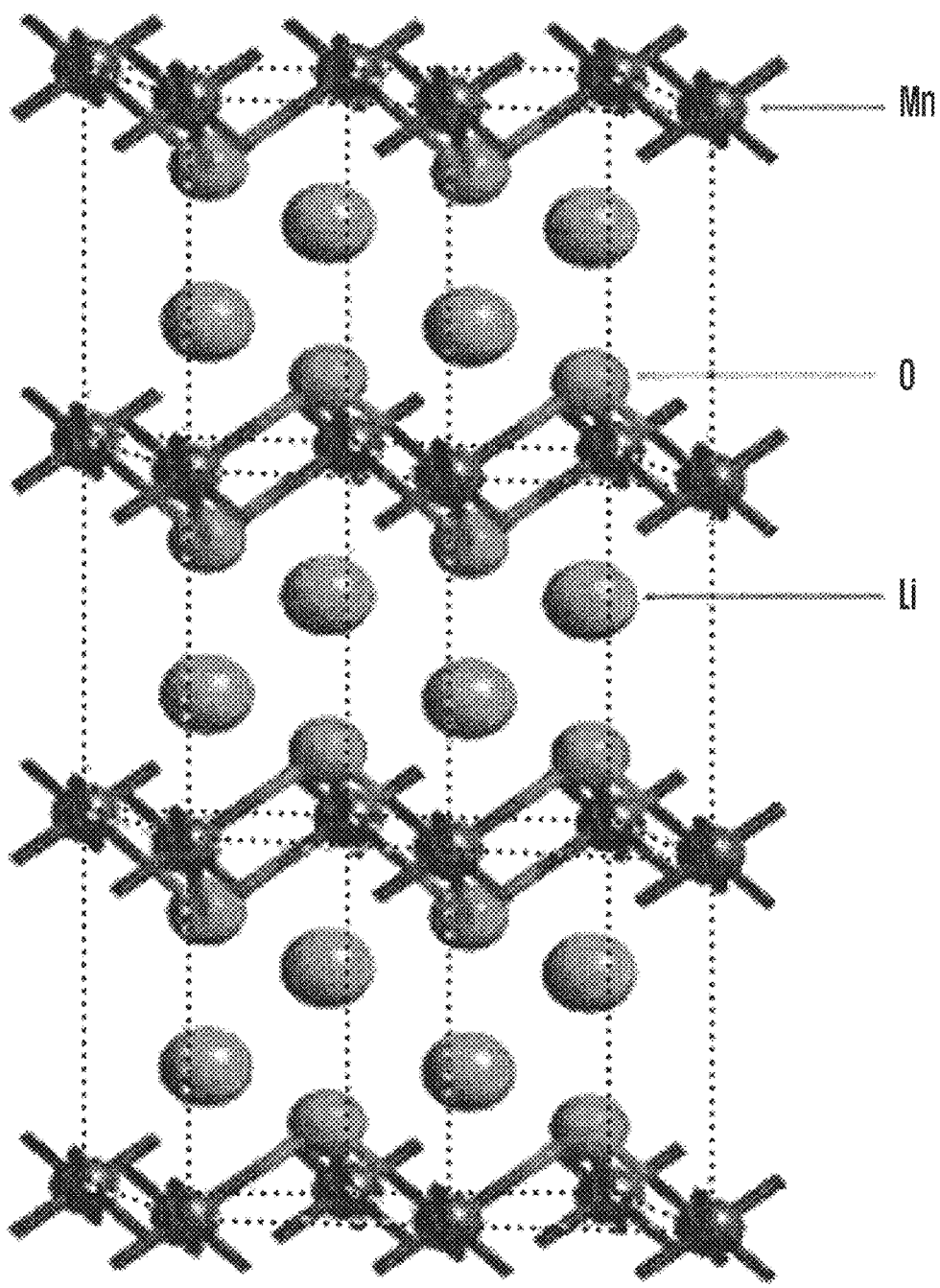
FIG. 1B is a schematic view showing intercalation of lithium-manganese oxides having layered structure.

That is, in accordance with the present invention, as the conventional layered structure of lithium-manganese oxides, it is possible to show reversible intercalation and deintercalation of lithium ions shown in FIGS. 1A and 1B. Further, since a portion of manganese is substituted with lithium ions, it is possible to improve reversible intercalation and deintercalation effect of lithium ions. More specifically, the lithium-manganese oxides in accordance with the present invention has the same structure except that a portion of manganese is substituted with lithium and metals M in the conventional lithium-manganese oxide structure shown in FIGS. 1A and 1B, and reversible intercalation and deintercalation of lithium ions can be performed with high efficiency when the lithium-manganese oxides are used as lithium adsorbent.

The lithium-manganese oxide in accordance with the present invention is characterized in that crystal lattice volume is changed to 30% or less by intercalation and deintercalation of lithium ions. As described above, since the lithium-manganese oxides or lithium-manganese transition metal oxides in accordance with the present invention have layered structure with changeable volume, intercalation and deintercalation of lithium ions can be readily performed when the oxides are used as lithium adsorbent.

The lithium-manganese oxides generate oxidation-reduction reaction within a range of average oxidation number 2 to 4 of the metal M by intercalation and deintercalation of lithium ions.

The lithium-manganese oxides of the chemical formula 1 is manufactured by solid-mixing lithium raw material, manganese raw material and metal raw material to form mixture, and heat-treating the mixture. At this time, when y=0 in the chemical formula 1, the lithium raw material and the manganese raw material are solid-mixed to form mixture.

While the lithium raw material that can be used in the present invention is not limited, it is preferable to use water-soluble salt containing lithium. Specifically, the lithium raw material may use a material selected from the group consisting of lithium carbonate, lithium hydroxide, lithium nitrate, lithium acetate, and combination thereof.

In addition, the manganese raw material may use a material selected from the group consisting of manganese, manganese oxide, manganese hydroxide, and combination thereof, but not limited thereto.

Further, the metal raw material may use a material selected from the group consisting of a metal, and oxide and hydroxide thereof, the metal being selected from the group consisting of metals defined as M of the chemical formula 1, i.e., Ti, Mn, V, Cr, Fe, Co, Ni, Cu, Zn, Zr, Nb, Mo, W, Ag, Sn, Ge, Si, Al, and alloy thereof, but not limited thereto.

Specific examples may be $Mn_2O_3$, $Mn_3O_4$, $MnO$, $MnO_2$, $Mn(ClO_4)_2 \cdot 6H_2O$, $MnSO_4 \cdot H_2O$, $MoO_3$, $WO_3$, $ZrO_2$, $VO$, $V_2O_3$, $V_2O_4$, $V_2O_5$, $V_4O_7$, $VOSO_4 \cdot nH_2O$, $NH_4VO_3$, and so on, and oxides and hydroxides containing the metal M, but not limited thereto.

The mixture formed by solid-mixing the lithium raw material, the manganese raw material and the metal raw material are heat-treated to manufacture the lithium-manganese oxides in accordance with the present invention.

In this process, the heat treatment may be performed at a temperature of 300-1400° C., more preferably, 900-1200° C. When the heat treatment temperature departs from the temperature range, impurities such as $Li_2MnO_3$, etc., not target compound, may be generated. When the impurities are generated, efficiency of intercalation and deintercalation of lithium ions may be decreased and its process may be also difficult.

In addition, the heat treatment process may be performed under reduction atmosphere, for example, nitrogen atmosphere, argon atmosphere, nitrogen/hydrogen mixed gas atmosphere, carbon monoxide/carbon dioxide mixed gas atmosphere, or helium atmosphere. Partial oxygen pressure in the reduction atmosphere may be in a range of not forming oxidation atmosphere, generally, less than about $2 \times 10^{-1}$ atm.

The lithium-manganese oxides or the lithium-manganese metal oxides as manufactured above have layered structure such that intercalation and deintercalation of lithium ions can be effectively and readily performed. Therefore, the lithium-manganese oxides in accordance with the present invention can be usefully adapted as a precursor of lithium adsorbent and active materials of electrodes of a lithium second battery.

In addition, when the lithium-manganese oxides or the lithium-manganese metal oxides are used as the precursor, it is possible to form lithium adsorbent capable of adsorbing and desorbing lithium ions using an ion exchange method. That is, the lithium-manganese oxides, etc., are acid-treated, the lithium-manganese oxides act as an ion sieve to function as an ion exchange type lithium adsorbent.

Since the acid treatment process is well known to those skilled in the art, the present invention can select a proper one of known methods. For example, the acid treatment may be performed in 0.3-1.0M acid solution 3 to 5 times, 22-26 hours each time. Acid solution usable in the oxidation may be hydrochloric acid solution, but not limited thereto. Further, in order to maximize generation of lithium holes for more effective reversible reaction of lithium ions and hydrogen ions during ion exchange reaction and to prevent elution of manganese ions, acid treatment may be performed in 0.5M hydrochloric acid solution four times, 24 hours each time.

It will be appreciated that the lithium adsorbent in accordance with the present invention represents high efficiency and selectivity in adsorption and desorption of lithium ions, high physical strength, and good chemical stability and durability, thereby increasing utilization probability.

Hereinafter, the present invention will be described in detail with reference to the following embodiments.

The following embodiments merely illustrate the present invention as examples, but not limiting the present invention.

Embodiment 1

$Mn_2O_3$ and $Li_2CO_3$ were solid mixed with Li:Mn Mole ratio 1.1:0.89. The mixture was heat-treated to 700° C. under nitrogen atmosphere and cooled to a room temperature to prepare lithium-manganese oxide $Li_{1.1}Mn_{0.9}O_2$.

Figure 2:
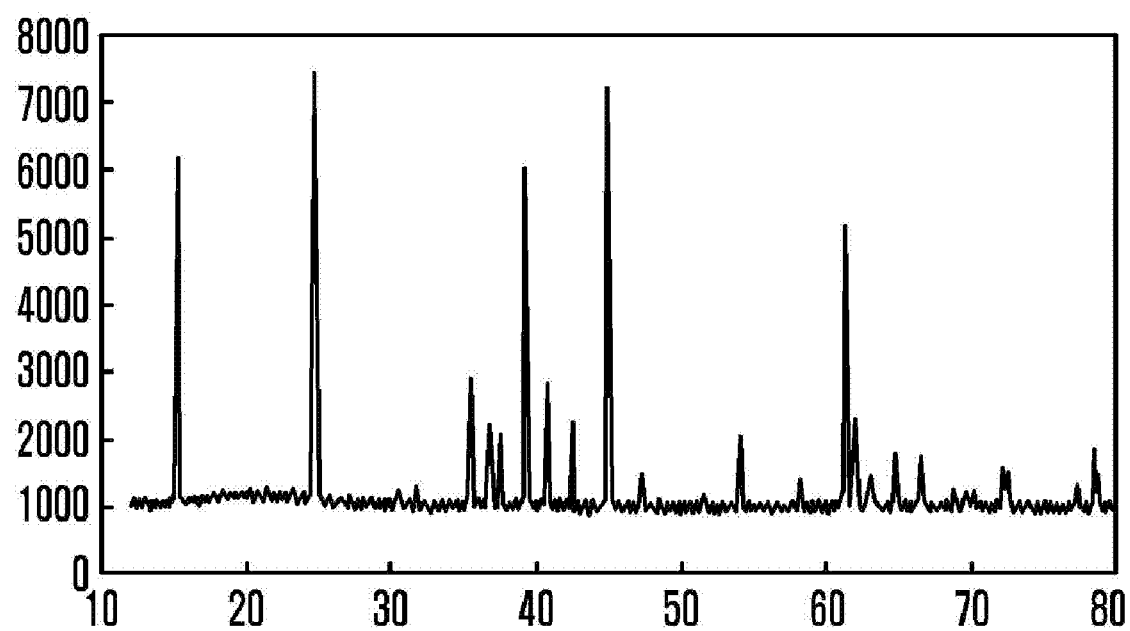
FIG. 2 is a view showing measurement result of X-ray Diffraction patterns (Philips X'pert X-ray Diffraction) of the lithium-manganese Oxides in accordance with a first exemplary embodiment of the present invention.

X-ray Diffraction patterns (Philips X'pert X-ray Diffraction) of the prepared lithium-manganese oxide was measured. The X-ray diffraction analysis was performed using CuK α X-ray (1.5418, 40 kV/30 mA) within a range of 2θ 10-80° at a scanning speed 0.02°/sec. FIG. 2 shows X-ray diffraction analysis result.

As can be seen from the X-ray diffraction analysis result shown in FIG. 2, the lithium-manganese oxide prepared in the embodiment 1 showed a single phase diffraction pattern of an orthorhombic crystalline structure.

Embodiment 2

$Li_2CO_3$, $Mn_2O_3$ and $V_2O_3$ were solid mixed with Li:Mn:V Mole ratio 1.1:0.89:0.01. The mixture was heat-treated to 1100° C. under nitrogen atmosphere to prepare lithium-manganese transition metal oxide $Li_{1.1}Mn_{0.89}V_{0.01}O_2$.

As a result of the same X-ray diffraction pattern analysis as the embodiment 1 of the lithium-manganese transition metal oxide, the lithium-manganese transition metal oxide also showed a single phase diffusion pattern of an orthorhombic crystalline structure.

Embodiment 3

Lithium adsorbent was prepared using the lithium-manganese oxide and the lithium-manganese transition metal oxide obtained in the embodiments 1 and 2. That is, the lithium-manganese oxide and the lithium-manganese transition metal oxide were acid treated in 0.5M hydrochloric acid solution four times, 24 hours each time, to prepare lithium adsorbent in accordance with the present invention.

Since the lithium-manganese oxide and the lithium-manganese transition metal oxide prepared in the first and second embodiment in accordance with the present invention have layered structure to readily perform intercalation and deintercalation of lithium ions, it will be appreciated that the lithium adsorbent prepared using the oxides as a precursor can be used as adsorbent having high lithium adsorption and desorption efficiency, and good chemical and physical stability and durability.

As can be seen from the foregoing, it is possible to provide lithium-manganese oxides or lithium-manganese metal oxides, and a method for preparing the same capable of effectively and readily performing intercalation and deintercalation of lithium ions.

In addition, lithium adsorbent using the lithium-manganese oxides or lithium-manganese metal oxides as a precursor can show high selectivity, efficiency and adsorption speed of lithium ions by intercalation and deintercalation of the lithium ions. Further, the lithium adsorbent in accordance with the present invention has good characteristics such as high chemical stability, physical strength and durability to increase practical applicability.

Furthermore, the lithium-manganese oxides or the lithium-manganese metal oxides in accordance with the present invention can effectively and readily perform intercalation and deintercalation of lithium ions such that the oxides can be used as active materials of electrodes of a lithium secondary battery.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A method for preparing lithium-manganese oxides comprising:
   solid mixing lithium raw material, manganese raw material and metal raw material—metal is expressed as the following chemical formula 1—to manufacture mixture; and
   heat treating the mixture under reduction atmosphere, $Li_{1+x}Mn_{1-x-y}M_yO_{2+z}$  [Chemical Formula 1]

wherein $0.01 \leq x \leq 0.5$, $0 \leq y \leq 0.3$, $-0.2 \leq z \leq 0.2$, and M is a metal selected from the group consisting of Mn, V, Cr, Co, Ni, Cu, Zn, Zr, Nb, Mo, W, Ag, Sn, Ge, Si, Al, and alloy thereof, and
   wherein the lithium-manganese oxides have a layered structure.

2. The method of claim 1, wherein the lithium raw material is water-soluble salt containing lithium.

3. The method of claim 1, wherein the lithium raw material is selected from the group consisting of lithium carbonate, lithium hydroxide, lithium nitrate, lithium acetate, and combination thereof.

4. The method of claim 1, wherein the manganese raw material is selected from the group consisting of manganese, manganese oxide, manganese hydroxide, and combination thereof.

5. The method of claim 1, wherein the metal raw material is selected from the group consisting of a metal expressed as M defined in the chemical formula 1, oxide, hydroxide and combination thereof containing the same.

6. The method of claim 1, wherein the reduction atmosphere is selected from the group consisting of nitrogen atmosphere, argon atmosphere, nitrogen/hydrogen mixed gas atmosphere, carbon monoxide/carbon dioxide mixed gas atmosphere, helium atmosphere, and combination thereof.

7. The method of claim 1, wherein the heat treatment is performed at a temperature 300-1400° C.

8. A method of preparing lithium adsorbent comprising:
   solid mixing lithium raw material, manganese raw material and metal raw material—metal is expressed as the following chemical formula 1—to manufacture mixture;
   heat treating the mixture under reduction atmosphere to form a precursor expressed as the chemical formula 1, $Li_{1+x}Mn_{1-x-y}M_yO_{2+z}$  [Chemical Formula 1]

wherein $0.01 \leq x \leq 0.5$, $0 \leq y \leq 0.3$, $-0.2 \leq z \leq 0.2$, and M is a metal selected from the group consisting of Mn, V, Cr, Co, Ni, Cu, Zn, Zr, Nb, Mo, W, Ag, Sn, Ge, Si, Al, and alloy thereof; and
   acid treating the precursor, wherein the precursor has a layered structure.

* * * * *